US012691698B2

(12) United States Patent
Moriyama et al.

(10) Patent No.: US 12,691,698 B2
(45) Date of Patent: Jul. 28, 2026

(54) PRINTING APPARATUS

(71) Applicant: SEIKO EPSON CORPORATION, Tokyo (JP)

(72) Inventors: Ryuji Moriyama, Matsumoto (JP); Yuta Watanabe, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 117 days.

(21) Appl. No.: 18/811,027

(22) Filed: Aug. 21, 2024

(65) Prior Publication Data

US 2025/0065651 A1 Feb. 27, 2025

(30) Foreign Application Priority Data

Aug. 24, 2023 (JP) ................................ 2023-136012

(51) Int. Cl.
*B41J 25/00* (2006.01)

(52) U.S. Cl.
CPC .................................. *B41J 25/001* (2013.01)

(58) Field of Classification Search
CPC ..................................................... B41J 25/001
See application file for complete search history.

(56) References Cited

U.S. PATENT DOCUMENTS

2014/0267496 A1* 9/2014 Kobayashi ............. B41J 25/308 347/37
2023/0226832 A1* 7/2023 Momose ................ B41J 13/103 347/104

FOREIGN PATENT DOCUMENTS

JP 3817361 B2 * 9/2006 .......... B41J 25/3082
JP 2021-066045 A 4/2021

* cited by examiner

*Primary Examiner* — Sharon Polk
(74) *Attorney, Agent, or Firm* — WORKMAN NYDEGGER

(57) ABSTRACT

A printing apparatus includes a moving mechanism configured to be movable in a front-rear direction with respect to a medium support portion that supports a printing medium, and a driving mechanism that moves the moving mechanism in the front-rear direction, wherein the moving mechanism includes a first guide shaft, a second guide shaft, a first leg portion movably supported by the first guide shaft, and a second leg portion movably supported by the second guide shaft, the driving mechanism includes a leg-driving motor and a transmission structure that transmits driving force generated by the leg-driving motor to the first leg portion and the second leg portion, and the leg driving motor is disposed between the first guide shaft and the second guide shaft in the left-right direction and drives the first leg portion and the second leg portion in the front-rear direction.

12 Claims, 8 Drawing Sheets

PRINTING APPARATUS

The present application is based on, and claims priority from JP Application Serial Number 2023-136012, filed Aug. 24, 2023, the disclosure of which is hereby incorporated by reference herein in its entirety.

BACKGROUND

1. Technical Field

The present disclosure relates to a printing apparatus.

2. Related Art

JP 2021-66045 A discloses a printing apparatus. This printing apparatus moves a gantry that holds a recording head.

In the printing apparatus disclosed in JP 2021-66045 A, in order to stabilize movement of a moving unit, driving force may be applied to two or more positions of the moving unit. However, when the driving force is applied to the two or more portions of the moving unit, there is a problem in that a bias occurs in the driving force applied to the moving unit.

SUMMARY

An aspect of the present disclosure is a printing apparatus including a medium support portion configured to support a printing medium, a printing unit configured to perform printing on the printing medium, a moving mechanism configured to support the printing unit and to be movable in a first direction with respect to the medium support portion, and a driving mechanism configured to move the moving mechanism in the first direction, wherein the moving mechanism includes a first guide shaft provided on one side with respect to the medium support portion in a second direction intersecting the first direction, and extending in the first direction, a second guide shaft provided on another side with respect to the medium support portion in the second direction, and extending in the first direction, a first leg portion movably supported by the first guide shaft, and a second leg portion movably supported by the second guide shaft, the driving mechanism includes a driving source, and a transmission structure for transmitting driving force generated by the driving source to the first leg portion and the second leg portion, and the driving source is disposed between the first guide shaft and the second guide shaft in the second direction, and drives the first leg portion and the second leg portion in the first direction.

DESCRIPTION OF EMBODIMENTS

1. Overall Configuration

Figure 1:
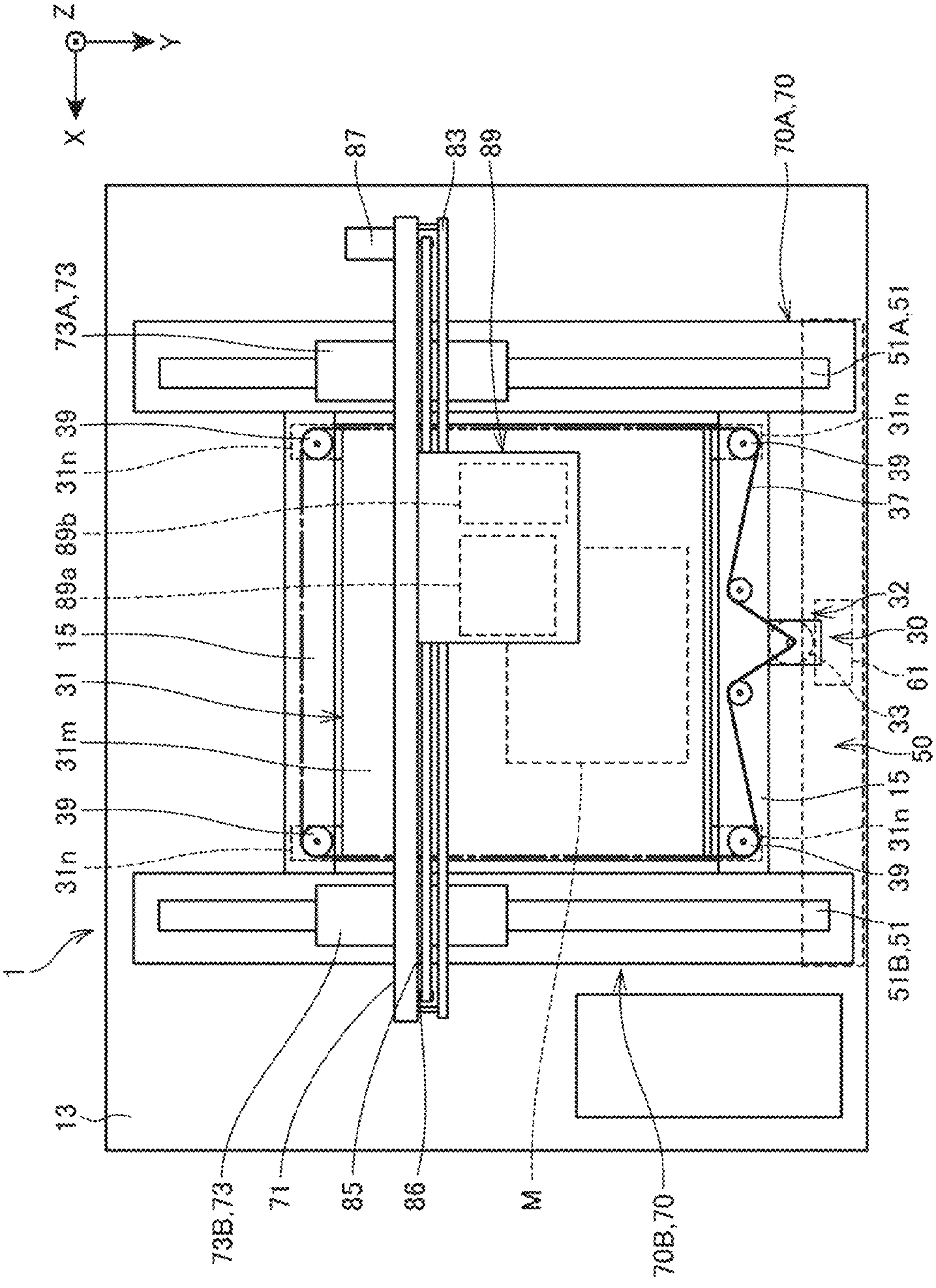
FIG. 1 is a plan view illustrating an example of an overall configuration of a printing apparatus according to the present embodiment.

FIG. 1 is a plan view illustrating an example of an overall configuration of a printing apparatus 1 according to the present embodiment.

As illustrated in FIG. 1, the printing apparatus 1 includes a recording head 89*a* and a medium support portion 30. The medium support portion 30 supports a printing medium M. The recording head 89*a* ejects liquid such as ink to form an image on the printing medium M. That is, the printing apparatus 1 is an apparatus that forms an image on the printing medium M by ejecting liquid from the recording head 89*a*.

The printing medium M is a sheet, a cloth, or a three-dimensional object. The sheet may be a sheet made of paper or a synthetic resin. The cloth may be any of a non-woven cloth, a knitted material, and a fabric. The three-dimensional object includes ornaments such as clothes or shoes, daily necessities, mechanical components, and other various objects.

A type of liquid ejected onto the printing medium M by the printing apparatus 1 is not limited, as long as the liquid has fluidity. For example, the printing apparatus 1 is a printer that forms an image on the printing medium M by discharging ink of one or a plurality of colors toward a front surface of the printing medium M by using the recording head 89*a*.

In each of FIGS. 1 to 8, an X-axis, a Y-axis, and a Z-axis are illustrated. The X-axis, the Y-axis, and the Z-axis are orthogonal to one another. The Z-axis is an axis extending in a vertical direction. The X-axis and the Y-axis are parallel to a horizontal plane. In the following description, a direction along the X-axis is referred to as a left-right direction, and a direction along the Y-axis is referred to as a front-rear direction. Specifically, a positive direction of the Z-axis is an upward direction, a positive direction of the X-axis is a rightward direction, and a positive direction of the Y-axis is a forward direction.

The front-rear direction corresponds to an example of a "first direction".

The left-right direction corresponds to an example of a "second direction". Note that the second direction is a direction intersecting the first axis direction. In the present embodiment, a case where the second direction is a direction orthogonal to the first direction will be described.

The printing apparatus 1 includes a bottom plate 13, a pair of base members 15, a pair of guide shafts 51, and the medium support portion 30. Each of the base members 15 is a member extending in the left-right direction. The two base members 15 are disposed side by side in the front-rear direction at the bottom plate 13, and are fixed to the bottom plate 13. The guide shaft 51 is a shaft extending in the front-rear direction, and the two guide shafts 51 are disposed side by side in the left-right direction so as to straddle the two base members 15.

The guide shafts 51 include a first guide shaft 51A and a second guide shaft 51B. The first guide shaft 51A is provided rightward the medium support portion 30 in the left-right direction and extends in the front-rear direction. The second guide shaft 51B is provided leftward the medium support portion 30 in the left-right direction and extends in the front-rear direction.

Rightward corresponds to an example of "one side".

Leftward corresponds to an example of "another side".

Figure 2:
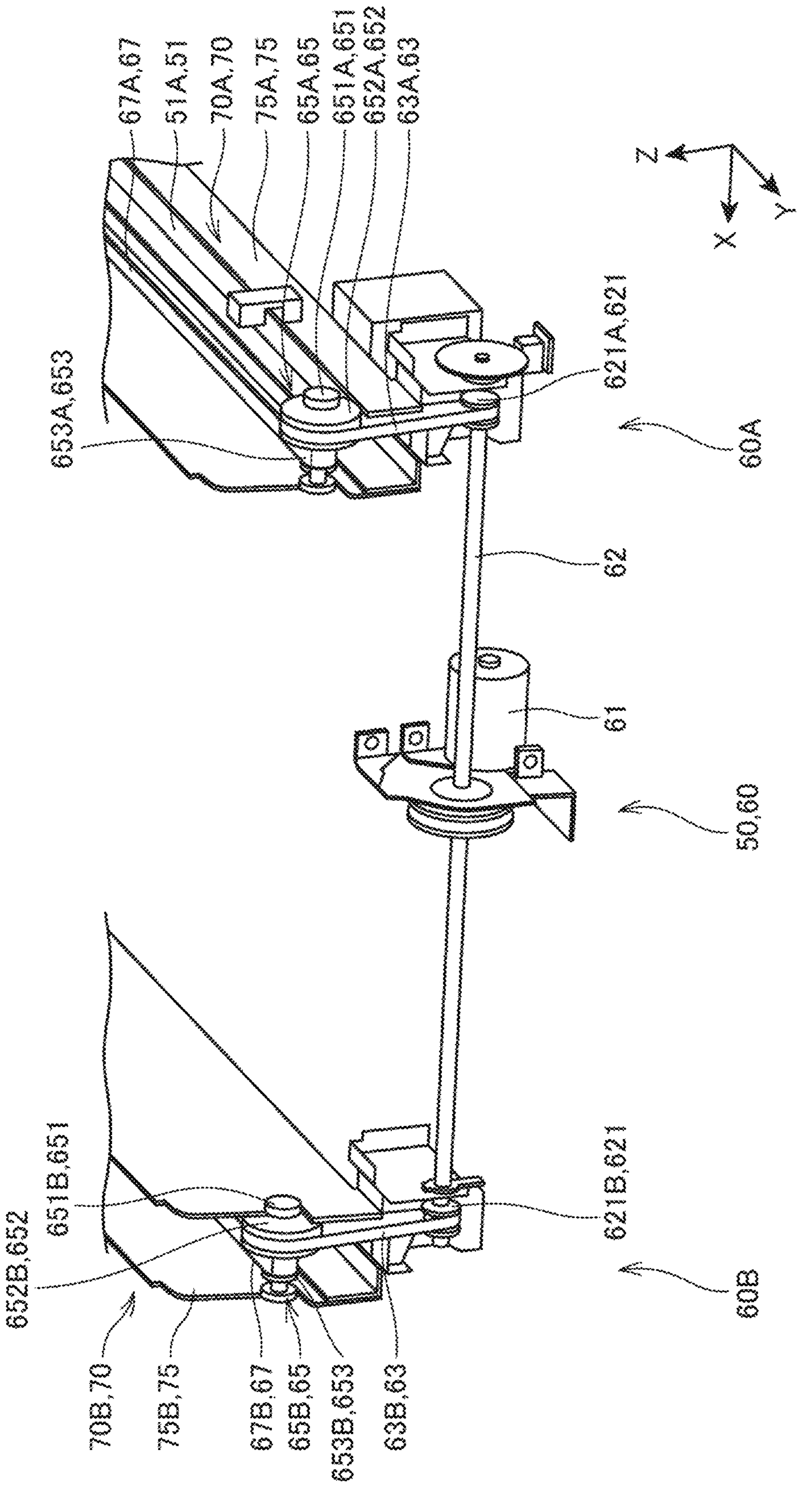
FIG. 2 is a perspective view illustrating an example of a configuration of a driving mechanism.
Figure 3:
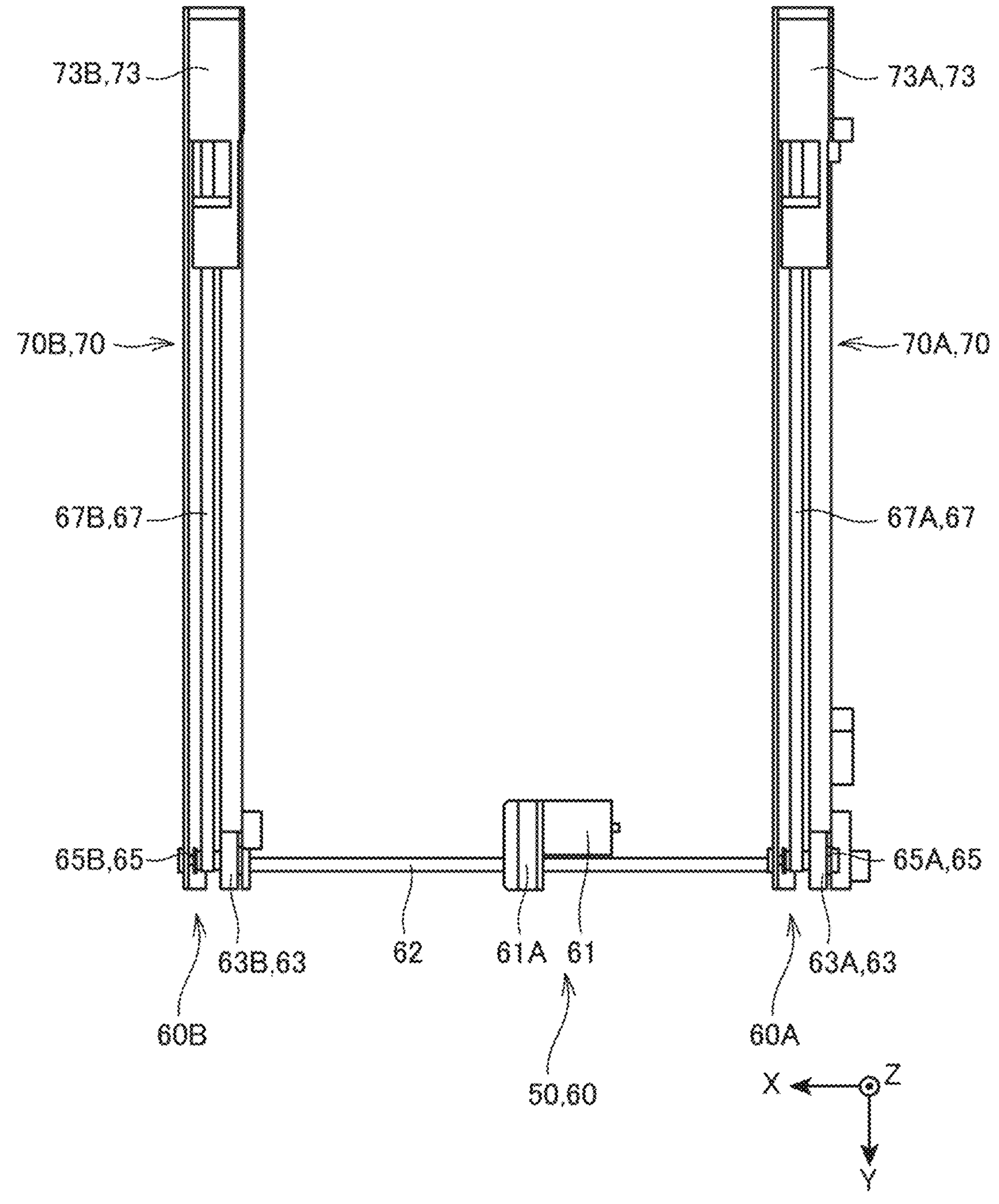
FIG. 3 is a plan view illustrating an example of a configuration of a moving mechanism and the driving mechanism.

The guide shaft 51 will be further described with reference to FIGS. 2 and 3.

The medium support portion 30 supports the printing medium M. The medium support portion 30 includes the table 31 and a height moving mechanism 32. The table 31 is disposed at a position surrounded by the pair of base members 15 and the pair of guide shafts 51, in the front-rear direction and in the left-right direction. The table 31 includes a support surface 31*m*. The support surface 31*m* is a rectangular surface that is parallel to an XY plane and faces upward. The support surface 31*m* supports the printing medium M placed on the support surface 31*m*.

Further, the table 31 includes protruding portions 31*n* protruding outward from the support surface 31*m* in plan view, at lower portions of four corners of the support surface 31*m*. The table 31 is supported so as to be movable up and down with respect to the base members 15 by the protruding portions 31*n* fixed to lifting mechanisms 39 to be described later.

The height moving mechanism 32 is a mechanism that moves the table 31 up and down, to move the support surface 31*m*, and the printing medium M supported on the support surface 31*m* up and down. The height moving mechanism 32 includes a lifting motor 33, a lifting belt 37, and the lifting mechanisms 39. The lifting mechanism 39 includes a ball screw disposed along the vertical direction, a nut screwed onto the ball screw, and a pulley. The ball screw of the lifting mechanism 39 is rotatably supported by the base member 15. The nut of the lifting mechanism 39 is fixed to the protruding portion 31*n* of the table 31. The pulley of the lifting mechanism 39 is fixed to an upper portion of the ball screw. When the pulley of the lifting mechanism 39 rotates, the ball screw rotates, and the protruding portion 31*n* moves along the vertical direction together with the nut in accordance with the rotation of the ball screw.

The lifting motor 33 is a motor that rotates under the control of an unillustrated control unit. The control unit controls a rotation direction and rotation amount of the lifting motor 33. The lifting belt 37 is an annular belt wound around an output shaft of the lifting motor 33 and the pulleys of four lifting mechanisms 39. The lifting belt 37 is driven to circulate by the rotation of the lifting motor 33. The lifting belt 37 transmits the rotation of the lifting motor 33 to the four pulleys of the lifting mechanisms 39. In this way, the ball screws of the lifting mechanisms 39 rotate to move the table 31 along the vertical direction.

The rotation direction of the lifting motor 33 can be switched between a forward direction in which the table 31 is moved upward and a reverse direction in which the table 31 is moved downward. The printing apparatus 1 lifts and lowers the table 31 by operating the lifting motor 33.

A carriage 89 is a substantially cuboid box, and is supported by a main frame 71 via a carriage guide shaft 83. The carriage guide shaft 83 is a shaft-like member fixed to the main frame 71 and extends in the left-right direction along the main frame 71. Both ends of the main frame 71 in the left-right direction are supported by a pair of leg portions 73 of a moving mechanism 70.

Next, the moving mechanism 70 will be described with reference to FIG. 2 and FIG. 3.

The carriage guide shaft 83 supports the carriage 89 such that the carriage 89 is movable in the left-right direction. Note that a lower end of the carriage 89 is positioned higher than a position of the support surface 31*m* when the table 31 is positioned at an uppermost position. Thus, the carriage 89 moves above the support surface 31*m* in the front-rear direction and the left-right direction, without interfering with the support surface 31*m*.

Further, the carriage 89 is coupled to a carriage driving belt 85. The carriage driving belt 85 is an annular belt disposed along the carriage guide shaft 83 by having one end wound around a carriage driving pulley 86 and another end wound around an output shaft of a carriage driving motor 87. The carriage driving pulley 86 is a pulley that is rotatably fixed to a right end of the main frame 71. The carriage driving motor 87 is a motor that is fixed to a left end of the main frame 71 and rotates an output shaft thereof under the control of the unillustrated control unit.

The carriage driving motor 87 rotates the output shaft to drive the carriage driving belt 85 to circulate. In this way, the carriage driving motor 87 moves the carriage 89 coupled to the carriage driving belt 85 in the left-right direction along the carriage guide shaft 83.

The carriage 89 includes the recording head 89*a* and an irradiation unit 89*b*. The recording head 89*a* includes a plurality of nozzles (not illustrated) that open downward from a lower end surface of the carriage 89. The recording head 89*a* ejects liquid from these nozzles by driving piezoelectric actuators (not illustrated).

When the recording head 89*a* ejects the liquid from the nozzles, the ejected liquid flies between the nozzles and the printing medium M placed on the table 31 and lands on the printing medium M. Note that in the present embodiment, the liquid ejected from the nozzle of the recording head 89*a* is ink to be cured by an ultraviolet ray. The recording head 89*a* forms characters and images formed by the liquid on the printing medium M, by causing the liquid to land on the printing medium M supported by the medium support portion 30.

The recording head 89*a* corresponds to an example of a "printing unit".

The irradiation unit 89*b* includes an irradiation window (not illustrated) facing downward from the lower end surface of the carriage 89. The irradiation window includes a plate member made of a transmissive material. The irradiation unit 89*b* emits irradiation light from a light-source unit (not illustrated) through the irradiation window. The irradiation light emitted from the irradiation unit 89*b* passes between the irradiation window and the printing medium M placed at the table 31, and is emitted onto the printing medium M on which the recording has been performed by the recording head 89*a*.

In the present embodiment, the irradiation unit 89*b* is provided with an ultraviolet light emitting diode (UV-LED) that emits ultraviolet rays, and the irradiation light is the ultraviolet ray. In other words, in the present embodiment, the irradiation unit 89*b* emits the ultraviolet ray to the ink that has landed on the medium M and is cured by the ultraviolet ray, and thus the ink is fixed onto the printing medium M.

2. Configuration of Moving Mechanism and Driving Mechanism

Next, a configuration of the moving mechanism 70 and the driving mechanism 50 will be described with reference to FIGS. 2 and 3. FIG. 2 is a perspective view illustrating an example of the driving mechanism 50. The drawing is a plan view illustrating an example of the configuration of the moving mechanism 70 and the driving mechanism 50.

As described with reference to FIG. 1, the moving mechanism 70 is configured to support the carriage 89 and to be movable in the front-rear direction with respect to the medium support portion 30. The driving mechanism 50 moves the moving mechanism 70 in the front-rear direction.

The moving mechanism 70 includes a first moving mechanism 70A and a second moving mechanism 70B. The second moving mechanism 70B and the first moving mechanism 70A are configured to be identical to each other.

The first moving mechanism 70A includes a first guide shaft 51A, a first leg portion 73A, and a first frame body 75A. The second moving mechanism 70B includes a second guide shaft 51B, a second leg portion 73B, and a second frame body 75B.

The first guide shaft 51A is a cylindrical shaft that is provided rightward the medium support portion 30 in the left-right direction, and extends in the front-rear direction. The first guide shaft 51A supports the first leg portion 73A so as to be movable in the front-rear direction. The second guide shaft 51B is a cylindrical shaft that is provided leftward the medium support portion 30 in the left-right direction, and extends in the front-rear direction. The second guide shaft 51B supports the second leg portion 73B so as to be movable in the front-rear direction.

The second guide shaft 51B and the first guide shaft 51A are configured to be identical to each other. That is, a material of the second guide shaft 51B is the same as a material of the first guide shaft 51A. In addition, the second guide shaft 51B is formed to have the same diameter as that of the first guide shafts 51A. The second guide shaft 51B is formed to have the same length as that of the first guide shafts 51A. Further, similarly to the first guide shaft 51A, the second guide shaft 51B is disposed along the front-rear direction.

The first guide shaft 51A and the second guide shaft 51B correspond to the pair of guide shafts 51.

The first leg portion 73A supports a right end portion of the main frame 71 illustrated in FIG. 1. The first leg portion 73A is supported by the first guide shaft 51A so as to be movable in the front-rear direction. The first leg portion 73A is moved in the front-rear direction on the first guide shaft 51A by the driving mechanism 50.

The second leg portion 73B supports a left end portion of the main frame 71 illustrated in FIG. 1. The second leg portion 73B is supported by the second guide shaft 51B so as to be movable in the front-rear direction. The second leg portion 73B is moved in the front-rear direction on the second guide shaft 51B by the driving mechanism 50.

The second leg portion 73B and the first leg portion 73A are configured to be identical to each other. That is, the second leg portion 73B is formed to have the same shape as that of the first leg portion 73A. Further, the second leg portion 73B is formed to have the same size as that of the first leg portion 73A. Further, similarly to the first leg portion 73A, the second leg portion 73B is disposed along the front-rear direction and the vertical direction, in other words, along a YZ plane.

The first leg portion 73A and the second leg portion 73B correspond to the pair of leg portions 73.

The configuration of the leg portions 73 will be further described with reference to FIG. 4.

The first frame body 75A accommodates the first guide shaft 51A and the first leg portion 73A. The first frame body 75A extends in the front-rear direction. The first frame body 75A is formed by a bottom member 751A and two side surface members 752A and 753A into a substantially U-shape in front view seen from the forward direction toward a rearward direction. The first guide shaft 51A is fixed to a bottom surface of the first frame body 75A.

The second frame body 75B accommodates the second guide shaft 51B and the second leg portion 73B. The second frame body 75B extends in the front-rear direction. The second frame body 75B is formed by a bottom member 751B and two side surface members 752B and 753B into a substantially U-shape in front view seen from the forward direction toward the rearward direction. The second guide shaft 51B is fixed to a bottom surface of the second frame body 75B.

The second frame body 75B and the first frame body 75A are configured to be identical to each other. The first frame body 75A and the second frame body 75B correspond to a pair of frame bodies 75.

The bottom members 751A, 751B and the side surface members 752A, 753A, 752B, 753B will be further described with reference to FIG. 7.

The driving mechanism 50 moves the first leg portion 73A along the first guide shafts 51A, and moves the second leg portion 73B along the second guide shafts 51B.

The driving mechanism 50 includes a leg-driving motor 61 and a transmission structure 60 that transmits driving force generated by the leg-driving motor 61 to the first leg portion 73A and the second leg portion 73B.

The leg-driving motor 61 is disposed at a position corresponding to front end portions of the first guide shaft 51A and the second guide shaft 51B in the front-rear direction. Further, the leg-driving motor 61 is disposed between the first guide shaft 51A and the second guide shaft 51B in the left-right direction. For example, the leg-driving motor 61 may be disposed at a substantially central position between the first guide shaft 51A and the second guide shaft 51B in the left-right direction. For example, the leg-driving motor 61 may further be disposed at a central position between a first belt 63A of a first transmission structure 60A and a first belt 63B of a second transmission structure 60B in the left-right direction. The first belt 63A and the first belt 63B will be described later with reference to FIGS. 2 and 3.

The leg-driving motor 61 drives the first leg portion 73A and the second leg portion 73B in the front-rear direction via the transmission structure 60, by rotationally driving an output shaft of the leg-driving motor 61 in accordance with an instruction from the unillustrated control unit.

The leg-driving motor 61 corresponds to an example of a "driving source".

In this way, since the leg-driving motor 61 is disposed between the first guide shaft 51A and the second guide shaft 51B in the left-right direction, it is possible to suppress occurrence of a difference between driving force transmitted to the first transmission structure 60A and driving force transmitted to the second transmission structure 60B. For example, when the leg-driving motor 61 is disposed at the central position between the first belt 63A of the first transmission structure 60A and the first belt 63B of the second transmission structure 60B in the left-right direction, the driving force transmitted to the first transmission structure 60A and the driving force transmitted to the second transmission structure 60B can be made equal to each other. Therefore, the first leg portion 73A and the second leg portion 73B can be smoothly moved.

The transmission structure 60 includes a drive shaft 62, the first transmission structure 60A, and the second transmission structure 60B.

The drive shaft 62 is rotationally driven via the output shaft of the leg-driving motor 61 and a gear train 61A. The gear train 61A is formed by a plurality of gears meshing with each other. For example, when the gear train 61A includes two gears, one gear is formed integrally with the output shaft of the leg-driving motor 61, and another gear is formed integrally with the drive shaft 62. Then, driving force of the output shaft of the leg-driving motor 61 is transmitted from the output shaft of the leg-driving motor 61 to the one gear, transmitted from the one gear to the other gear meshing with the one gear, and transmitted from the other gear to the drive shaft 62 integrally formed with the other gear.

The drive shaft 62 is a columnar or cylindrical shaft extending in the left-right direction. A pair of first gears 621 are fixed to both end portions in the left-right direction of the drive shaft 62. The pair of first gears 621 include a right side first gear 621A and a left side first gear 621B. The pair of first gears 621 are rotationally driven by the gear train 61A integrally with the drive shaft 62.

The right side first gear 621A is included in the first transmission structure 60A. The left side first gear 621B is included in the second transmission structure 60B.

Each of the first transmission structure 60A and the second transmission structure 60B includes the first gear 621, a first belt 63, a composite gear 65, a second belt 67, and a second gear 69.

When the first transmission structure 60A and the second transmission structure 60B are distinguished from each other, the first gear 621 of the first transmission structure 60A is referred to as the first gear 621A, and the first gear 621 of the second transmission structure 60B is referred to as the first gear 621B. Further, when the first transmission structure 60A and the second transmission structure 60B are distinguished from each other, the first belt 63 of the first transmission structure 60A is referred to as the first belt 63A, and the first belt 63 of the second transmission structure 60B is referred to as the first belt 63B. Further, when the first transmission structure 60A and the second transmission structure 60B are distinguished from each other, the composite gear 65 of the first transmission structure 60A is referred to as a composite gear 65A, and the composite gear 65 of the second transmission structure 60B is referred to as a composite gear 65B. Further, when the first transmission structure 60A and the second transmission structure 60B are distinguished from each other, the second belt 67 of the first transmission structure 60A is referred to as a second belt 67A, and the second belt 67 of the second transmission structure 60B is referred to as a second belt 67B. Further, when the first transmission structure 60A and the second transmission structure 60B are distinguished from each other, the second gear 69 of the first transmission structure 60A is referred to as a second gear 69A, and the second gear 69 of the second transmission structure 60B is referred to as a second gear 69B.

The second gear 69 will be further described with reference to FIG. 5.

The composite gear 65 is disposed above the first gear 621. The composite gear 65 includes a rotary shaft 651, a third gear 652, and a fourth gear 653. The rotary shaft 651 extends in the left-right direction. Both ends of the rotary shaft 651 are rotatably supported by the frame body 75. The rotary shaft 651 is inserted through a center of the third gear 652, and is integrally formed with the third gear 652. Further, the rotary shaft 651 is inserted through a center of the fourth gear 653, and is integrally formed with the fourth gear 653. That is, the rotary shaft 651, the third gear 652, and the fourth gear 653 are integrally formed.

Note that the fourth gear 653 is disposed leftward with respect to the third gear 652. Further, a diameter of the fourth gear 653 is smaller, as compared with a diameter of the third gear 652.

The first belt 63 is an annular belt wound around the first gear 621, and the third gear 652 of the composite gear 65. The driving force transmitted from the leg-driving motor 61 to the first gear 621 is transmitted to the composite gear 65 by the first belt 63. The composite gear 65 is disposed such that a center of the third gear 652 of the composite gear 65 in the front-rear direction is positioned immediately above with respect to a center of the first gear 621 in the front-rear direction.

The second belt 67 is an annular belt wound around the fourth gear 653 of the composite gear 65, and the second gear 69. A width of the second belt 67 is larger than a width of the first belt 63. As illustrated in FIG. 5, the second gear 69 is rotatably supported by a rear end portion of the frame body 75. Additionally, as illustrated in FIG. 5, the second belt 67 is fixed to a left side surface of the leg portion 73 by a fixing member 734. That is, the driving force transmitted from the leg-driving motor 61 to the composite gear 65 is transmitted to the leg portion 73 by the second belt 67.

The second gear 69 and the fixing member 734 will be further described with reference to FIG. 5.

As described above with reference to FIGS. 2 and 3, the driving force of the leg-driving motor 61 is transmitted to the leg portion 73 through a path described below. That is, the driving force of the leg-driving motor 61 is transmitted from the output shaft of the leg-driving motor 61 to the drive shaft 62 via the gear train 61A. Then, the driving force transmitted to the drive shaft 62 is transmitted to the first belt 63 by the first gear 621. Further, the driving force transmitted to the first belt 63 is transmitted to the third gear 652 of the composite gear 65. The driving force transmitted to the third gear 652 of the composite gear 65 is transmitted to the fourth gear 653 of the composite gear 65 via the rotary shaft 651 of the composite gear 65. The driving force transmitted to the fourth gear 653 is transmitted to the leg portion 73 via the second belt 67 and the fixing member 734.

The first transmission structure 60A and the second transmission structure 60B are configured to be identical to each other.

For example, the first gear 621A of the first transmission structure 60A and the first gear 621B of the second transmission structure 60B are configured to be identical to each other. For example, the first gear 621A and the first gear 621B are formed to have the same material, and the first gear 621A and the first gear 621B are formed to have the same size. For example, when the first gear 621A and the first gear 621B are made of plastic, the first gear 621A and the first gear 621B are manufactured with the same metal frame body and under the same manufacturing conditions.

In this manner, since the first transmission structure 60A and the second transmission structure 60B are configured to be identical to each other, the driving force of the leg-driving motor 61 can be equally distributed to the first transmission structure 60A and the second transmission structure 60B. Therefore, the driving force acting on the first leg portion 73A and the driving force acting on the second leg portion 73B can be made equal to each other. Therefore, the first leg portion 73A and the second leg portion 73B can be smoothly moved.

In addition, since the first gear 621A and the first gear 621B are configured to be identical to each other, the driving force of the leg-driving motor 61 can be equally distributed to the first belt 63A and the first belt 63 via the first gear 621A and the first gear 621B. Therefore, the driving force acting on the first leg portion 73A and the driving force acting on the second leg portion 73B can be made equal to each other. Therefore, the first leg portion 73A and the second leg portion 73B can be smoothly moved.

Further, for example, the composite gear 65A of the first transmission structure 60A and the composite gear 65B of the second transmission structure 60B are configured to be identical to each other. Further, the composite gear 65 includes the rotary shaft 651, the third gear 652, and the fourth gear 653. Therefore, the rotary shaft 651A of the composite gear 65A and the rotary shaft 651B of the composite gear 65B are configured to be identical to each other. Further, the third gear 652A of the composite gear 65A and the third gear 652B of the composite gear 65B are configured to be identical to each other. In addition, a fixing position of the third gear 652A of the composite gear 65A with respect to the rotary shaft 651A and a fixing position of the third gear 652B of the composite gear 65B with respect to the rotary shaft 651B are configured to be identical to each other. Further, the fourth gear 653A of the composite gear 65A and the fourth gear 653B of the composite gear 65B are configured to be identical to each other. In addition, a fixing position of the fourth gear 653A of the composite gear 65A with respect to the rotary shaft 651A and a fixing position of the fourth gear 653B of the composite gear 65B with respect to the rotary shaft 651B are configured to be identical to each other.

Further, for example, a fixing position of the composite gear 65A to the frame body 75A in the front-rear direction and the vertical direction, and a fixing position of the composite gear 65B to the frame body 75B in the front-rear direction and the vertical direction are configured to be positions identical to each other.

Further, for example, the composite gear 65A of the first transmission structure 60A and the composite gear 65B of the second transmission structure 60B are disposed in directions identical to each other. For example, in the first transmission structure 60A, the composite gear 65A is disposed at the frame body 75A so that a center position of the fourth gear 653A is positioned leftward with respect to a center position of the third gear 652A. Similarly, in the second transmission structure 60B, the composite gear 65B is disposed at the frame body 75B so that a center position of the fourth gear 653B is positioned leftward with respect to a center position of the third gear 652B. Further, in other words, the composite gear 65A of the first transmission structure 60A and the composite gear 65B of the second transmission structure 60B are disposed facing in directions identical to each other. For example, in the positive direction of the X-axis, the composite gear 65A and the composite gear 65B are installed to face in the same direction. Further, for example, a relative position of the third gear 652A to the fourth gear 653A in the positive direction of the X-axis is the same as a relative position of the third gear 652B to the fourth gear 653B.

As described above, since the composite gear 65A and the composite gear 65B are configured to be identical to each other, the driving force of the leg-driving motor 61 can be equally distributed to the second belt 67A and the second belt 67B via the composite gear 65A and the composite gear 65B. Therefore, the driving force acting on the first leg portion 73A and the driving force acting on the second leg portion 73B can be made equal to each other. Therefore, the first leg portion 73A and the second leg portion 73B can be smoothly moved.

Further, for example, the first belt 63A of the first transmission structure 60A, and the first belt 63B of the second transmission structure 60B are configured to be identical to each other. For example, the first belt 63A is disposed rightward the first leg portion 73A, and the first belt 63B is disposed rightward the second leg portion 73B. In addition, for example, the first belt 63A and the first belt 63B are configured by toothed belts of the same material. The toothed belt is a belt in which ribs are formed so as to mesh with teeth formed at an outer periphery of the first gear 621, teeth formed at an outer periphery of the third gear 652 of the composite gear 65.

Further, the first belt 63A and the first belt 63B are formed of, for example, open belts. In this case, the first belt 63A and the first belt 63B are configured by toothed belts having sizes identical to each other. Further, the first belt 63A and the first belt 63B are formed by cutting mutually identical toothed belts to lengths identical to each other, and joining both ends.

In this way, since the first belt 63A and the first belt 63B are configured to be identical to each other, the driving force of the leg-driving motor 61 can be equally distributed to the composite gear 65A and the composite gear 65B via the first belt 63A and the first belt 63B. Therefore, the driving force acting on the first leg portion 73A and the driving force acting on the second leg portion 73B can be made equal to each other. Therefore, the first leg portion 73A and the second leg portion 73B can be smoothly moved.

Further, for example, the second belt 67A of the first transmission structure 60A, and the second belt 67B of the second transmission structure 60B are configured to be identical to each other. For example, the second belt 67A and the second belt 67A are configured by toothed belts of the same material. The toothed belt is a belt in which ribs are formed so as to mesh with teeth formed at an outer periphery of the fourth gear 653 of the composite gear 65, and teeth formed at an outer periphery of the second gear 69.

Further, the second belt 67A and the second belt 67B are formed of, for example, open belts. In this case, the second belt 67A and the second belt 67B are configured by toothed belts having sizes identical to each other. Further, the second belt 67A and the second belt 67B are formed by cutting mutually identical toothed belts to lengths identical to each other, and joining both ends.

In this way, since the second belt 67A and the second belt 67B are configured to be identical to each other, the driving force of the leg-driving motor 61 can be equally distributed to the first leg portion 73A and the second leg portion 73B via the second belt 67A and the second belt 67B. Therefore, the driving force acting on the first leg portion 73A and the driving force acting on the second leg portion 73B can be made equal to each other. Therefore, the first leg portion 73A and the second leg portion 73B can be smoothly moved.

As described with reference to FIG. 1 to FIG. 3, the moving mechanism 70 includes the main frame 71, the pair of leg portions 73, and the carriage 89. The main frame 71 is a plate member that is long in the left-right direction. The pair of leg portions 73 are fitted to the pair of guide shafts 51, and are moved along the guide shafts 51. The main frame 71 is fixed to upper ends of the pair of the leg portions 73, and is supported by the pair of the leg portions 73 from below. The main frame 71 moves together with the pair of leg portions 73 in the front-rear direction while being guided by the pair of guide shafts 51.

The pair of leg portions 73 are driven by the driving mechanism 50. Specifically, the second belt 67 is fixed to each of the pair of leg portions 73 by the fixing member 734.

Thus, when the second belt 67 is driven to circulate, power for moving the pair of leg portions 73 in the front-rear direction is applied to the pair of leg portions 73. In this way, the moving mechanism 70 moves in the front-rear direction.

A rotation direction of the leg-driving motor 61 can be switched between a forward direction in which the main frame 71 is moved frontward, and a reverse direction in which the main frame 71 is moved rearward. The printing apparatus 1 moves the main frame 71 forward and rearward by operating the leg-driving motor 61, in accordance with an instruction by the unillustrated control unit.

3. Configuration of Leg Portion

Next, a configuration of the leg portion 73 will be described with reference to FIGS. 4 and 5. FIG. 4 is a perspective view illustrating an example of the configuration of the leg portion 73.

Figure 4:
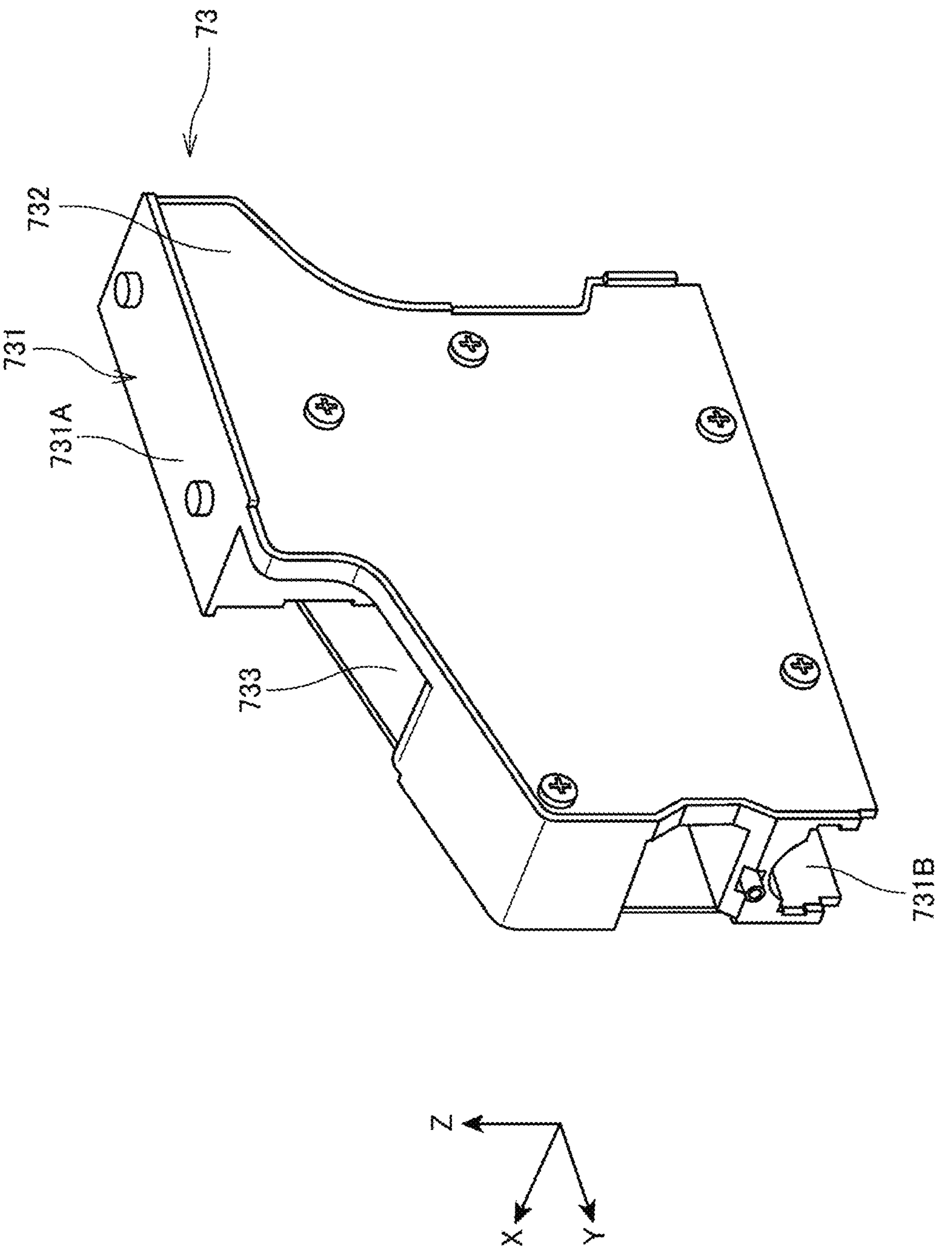
FIG. 4 is a perspective view illustrating an example of a configuration of a leg portion.

As illustrated in FIG. 4, the leg portion 73 includes a first member 731, a second member 732, and a third member 733.

The first member 731 is a member that achieves a main function of the leg portion 73. The first member 731 is formed of, for example, hard plastic. In the first member 731, ribs are formed in a lattice shape in order to ensure strength. The rib is formed to protrude leftward from a plate member formed at a right end of the first member 731.

An upper end portion 731A of the first member 731 is formed in a flat surface shape. The right end portion of the main frame 71 is fixed to the upper end portion 731A.

A lower end portion 731B of the first member 731 is formed at a concave portion which is convex upward. The concave portion extends in the front-rear direction. The concave portion formed at the lower end portion 731B is fitted to the guide shaft 51 so as to be movable in the front-rear direction.

The second member 732 is a plate member disposed along a left side surface of the first member 731. The second member 732 is formed of metal such as stainless steel, for example. Further, the second member 732 is fixed to the left side surface of the first member 731 with a plurality of bolts.

The third member 733 is a plate member disposed along a right side surface of the first member 731. The third member 733 is formed of metal such as stainless steel, for example. Further, the third member 733 is fixed to the right side surface of the first member 731 with a plurality of bolts.

The second member 732 and the third member 733 are reinforcing members fixed to the first member 731 in order to improve strength of the leg portion 73.

Figure 5:
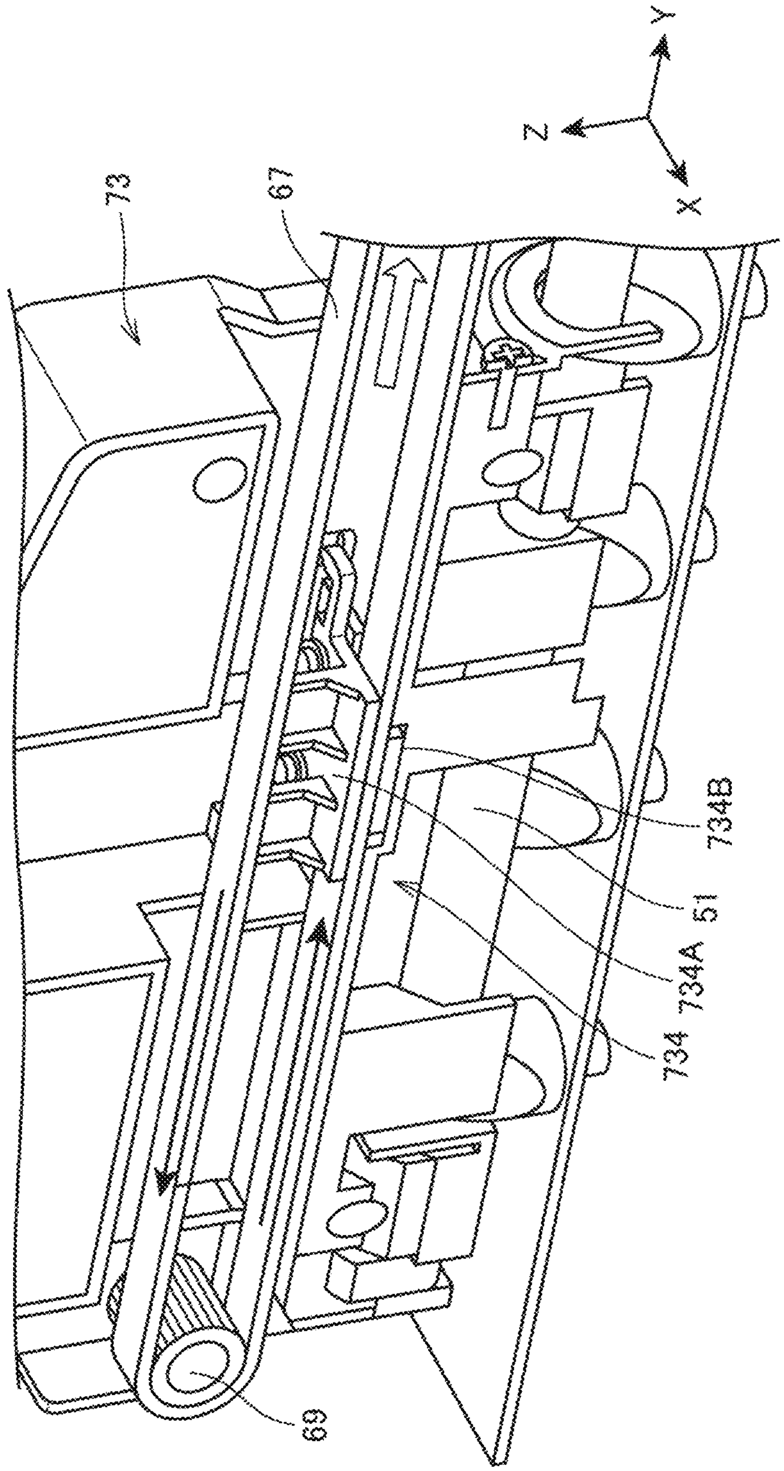
FIG. 5 is a perspective view illustrating an example of a configuration of a fixing member for fixing the leg portion to a second belt.

FIG. 5 is a perspective view illustrating an example of a configuration of the fixing member 734 that fixes the leg portion 73 to the second belt 67. As illustrated in FIG. 5, the fixing member 734 is formed at the left side surface of the leg portion 73 so as to protrude leftward. The fixing member 734 fixes the leg portion 73 to the second belt 67.

A rear end of the second belt 67 is wound around the second gear 69. The second gear 69 is erected in the vertical direction at a rear end of the frame body 75, and is disposed at a frame extending in the front-rear direction so as to be rotatable about an axis extending in the left-right direction.

The fixing member 734 fixes the leg portion 73 to a lower path of the second belt 67.

When an upper path of the second belt 67 is driven rearward and the lower path of the second belt 67 is driven forward as indicated by arrows, the leg portion 73 is moved forward as indicated by a white arrow.

The fixing member 734 includes an upper member 734A and a lower member 734B. The upper member 734A and the lower member 734B are fixed to the second belt 67 by sandwiching the second belt 67 of the lower path.

The upper member 734A is disposed between the upper path of the second belt 67 and the lower path of the second belt 67, and is fixed to an upper surface of the lower path of the second belt 67. The second belt 67 is a belt in which ribs are formed so as to mesh with the teeth formed at the outer periphery of the fourth gear 653 of the composite gear 65, and the teeth formed at the outer periphery of the second gear 69. The rib of the second belt 67 is formed at an upper surface of the second belt 67 in the lower path of the second belt 67. A rib protruding downward is formed at a lower surface of the upper member 734A so as to be fitted to the rib formed at the upper surface of the second belt 67.

In this way, since the rib formed at the lower surface of the upper member 734A is fitted to the rib of the second belt 67, the fixing member 734 is reliably fixed to the second belt 67.

The lower member 734B is disposed below the lower path of the second belt 67. Ribs are formed at an upper surface of the lower member 734B so as to increase a friction coefficient between the lower member 734B and the second belt 67. The rib formed at the upper surface of the lower member 734B is disposed to be shifted in the front-rear direction with respect to the rib formed at the lower surface of the upper member 734A so as to be engaged with the rib formed at the lower surface of the upper member 734A.

In this way, since the rib formed at the upper surface of the lower member 734B is disposed to be shifted in the front-rear direction with respect to the rib formed at the lower surface of the upper member 734A so as to mesh with the rib formed at the lower surface of the upper member 734A, the fixing member 734 is reliably fixed to the second belt 67.

4. Adjustment Mechanism for Belt Tension

Next, an adjustment mechanism for adjusting tension of the first belt 63 and the second belt 67 will be described with reference to FIGS. 6 and 7.

Figure 6:
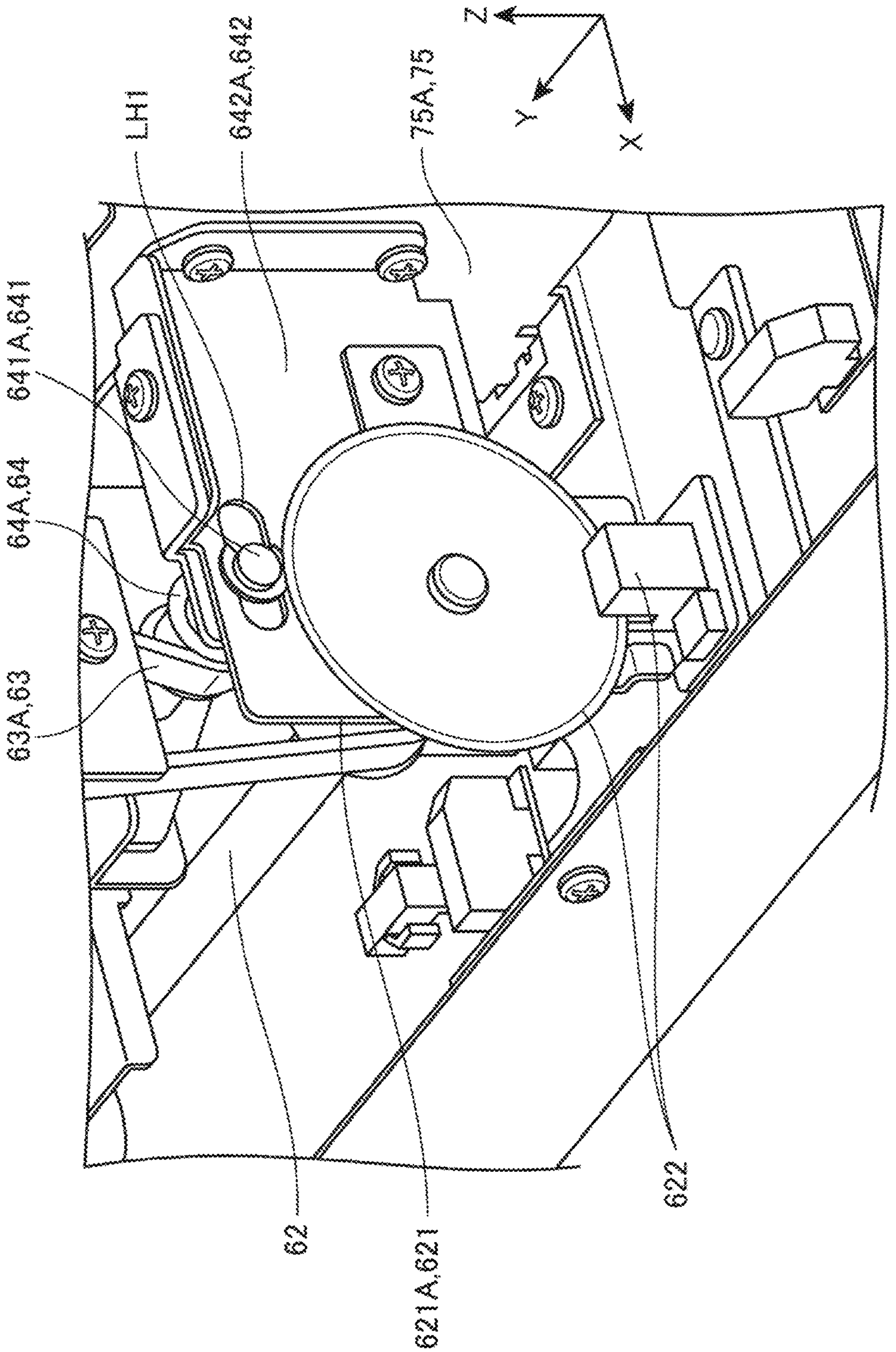
FIG. 6 is a perspective view illustrating an example of an adjustment mechanism for adjusting tension of a first belt.

FIG. 6 is a perspective view illustrating an example of the adjustment mechanism for adjusting the tension of the first belt 63.

The first transmission structure 60A includes a first adjustment mechanism for adjusting tension of the first belt 63A. Similarly, the second transmission structure 60B includes a second adjustment mechanism for adjusting tension of the first belt 63B. The first adjustment mechanism and the second adjustment mechanism are disposed at the same position in the front-rear direction. Further, the first adjustment mechanism and the second adjustment mechanism have configurations identical to each other.

Therefore, the first adjustment mechanism will be described with reference to FIG. 6, and the description of the second adjustment mechanism will be omitted.

In FIG. 6, the first belt 63 is the first belt 63A of the first transmission structure 60A. As described with reference to FIG. 2, the first belt 63A is an annular belt wound around the first gear 621A, and the third gear 652A of the composite gear 65A.

The third gear 652A of the composite gear 65A is disposed above the first gear 621A. In a path behind the first belt 63A, a tension-adjusting pulley 64A is disposed to press the first belt 63A forward.

The tension-adjusting pulley 64A is configured to be rotatable about a rotary shaft 641A extending in the left-right direction. The rotary shaft 641A is supported by a support member 642A. The support member 642A is a plate member fixed to a front end of the first frame body 75A. The support member 642A is fixed to the front end of the first frame body 75A in parallel with an XZ plane. An elongated hole LH1 through which the rotary shaft 641A is inserted is formed at the support member 642A. The elongated hole LH1 extends in the front-rear direction.

The tension-adjusting pulley 64A and the elongated hole LH1 correspond to an example of the "first adjustment mechanism".

By moving the rotary shaft 641A forward, the tension-adjusting pulley 64A can be moved forward, to increase the tension of the first belt 63A. Further, by moving the rotary shaft 641A rearward, the tension-adjusting pulley 64A can be moved rearward, to decrease the tension of the first belt 63A. In this way, the tension of the first belt 64A can be adjusted by adjusting the position of the tension-adjusting pulley 63A.

An encoder 622 is disposed at a right side end of the drive shaft 62. The encoder 622 detects a rotation direction and a rotation speed of the drive shaft 62. For the encoder 622, there are four types of mechanical, optical, magnetic, and electromagnetic induction. A case where the encoder 622 is, for example, of a magnetic type will be described. The encoder 622 includes a disk attached to the drive shaft 62 and a magnetic sensor. The disk is formed with an S pole and an N pole as a permanent magnet.

The magnetic sensor reads a change in a magnetic field distribution generated by the permanent magnet as the disk rotates. Then, the magnetic sensor detects the rotation direction and the rotation speed of the drive shaft 62 based on the change in the magnetic field distribution. The magnetic sensor outputs the detected rotation direction and rotation speed of the drive shaft 62 to the unillustrated control unit. The control unit controls the rotation direction and a rotation speed of the leg-driving motor 61 using the rotation direction and the rotation speed of the drive shaft 62 detected by the encoder 622, thereby controlling positions of the first leg portion 73A and the second leg portion 73B.

Figure 7:
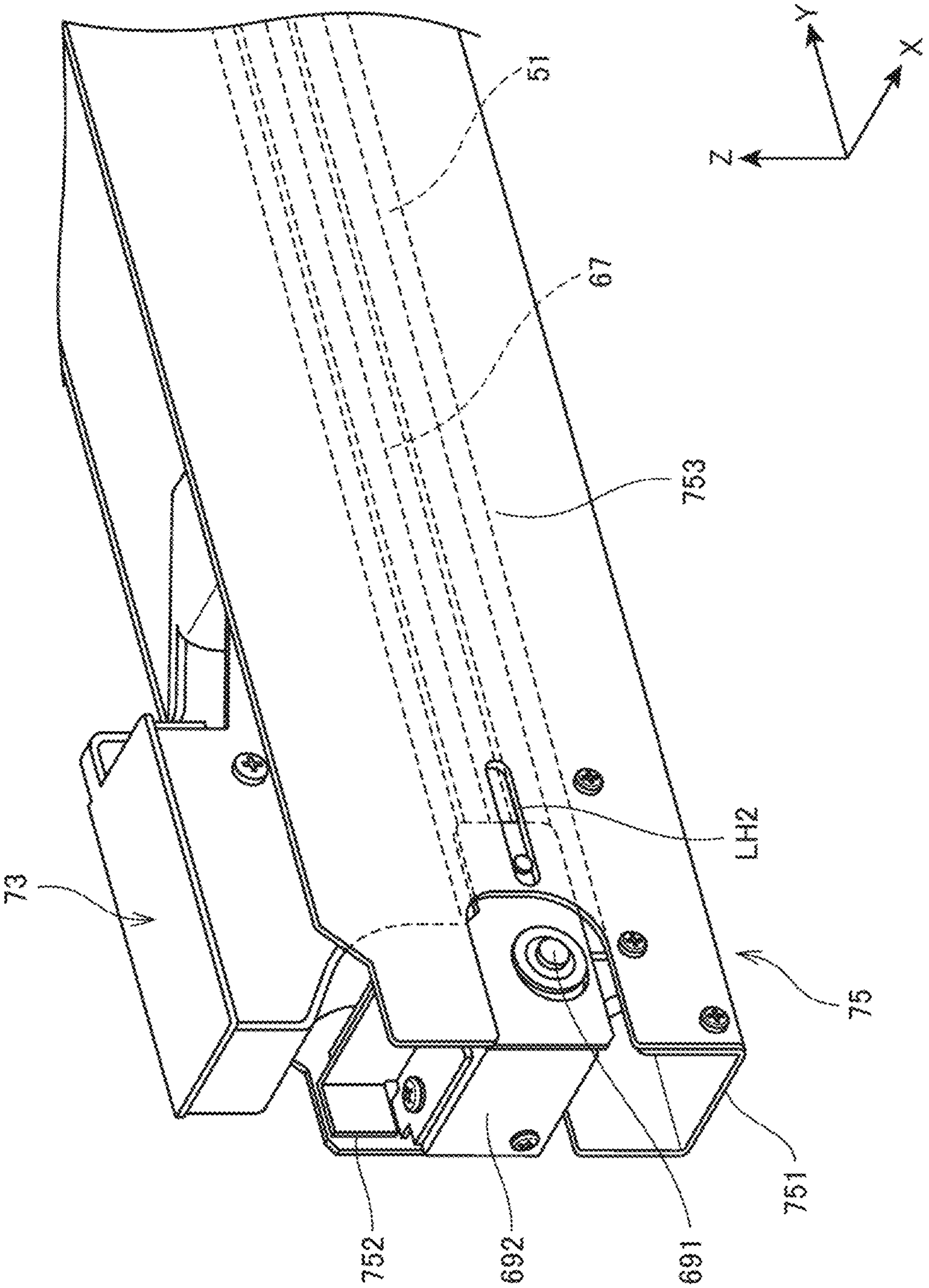
FIG. 7 is a perspective view illustrating an example of an adjustment mechanism for adjusting tension of the second belt.

FIG. 7 is a perspective view illustrating an example of the adjustment mechanism that adjusts the tension of the second belt 67. For example, the adjustment mechanism adjusts the tension of the second belt 67 by moving a rotary shaft 691 of the second gear 69 illustrated in FIG. 5 in the front-rear direction.

Note that the first transmission structure 60A includes a third adjustment mechanism that adjusts tension of the second belt 67A. Similarly, the second transmission structure 60B includes a fourth adjustment mechanism for adjusting tension of the second belt 67B. The third adjustment mechanism and the fourth adjustment mechanism are disposed at the same position in the vertical direction. Further, the third adjustment mechanism and the fourth adjustment mechanism have configurations identical to each other.

In FIG. 7, the adjustment mechanism for adjusting the tension of the second belt 67 will be described. The adjustment mechanism includes the third adjustment mechanism and the fourth adjustment mechanism.

As illustrated in FIG. 7, the rotary shaft 691 of the second gear 69 is rotatably supported by a support member 692.

The frame body 75 includes a bottom member 751, a right side surface member 752, and a left side surface member 753. The bottom member 751 has a U-shaped cross section and constitutes a bottom surface of the frame body 75. The right side surface member 752 and the left side surface member 753 are fixed to the bottom member 751 with a plurality of bolts. The right side surface member 752 is a plate member, is disposed rightward the bottom member 751, and is fixed to the bottom member 751 in parallel with the YZ plane. The left side surface member 753 is a plate member, is disposed leftward the bottom member 751, and is fixed to the bottom member 751 in parallel with the YZ plane.

An elongated hole LH2 through which a bolt for fixing the support member 692 is inserted is formed at a substantially central position in the vertical direction of a rear end portion of each of the right side surface member 752 and the left side surface member 753. The elongated hole LH2 extends in the front-rear direction.

The support member 692 included in the first transmission structure 60A is referred to as a support member 692A, and the support member 692 included in the second transmission structure 60B is referred to as a support member 692B.

The support member 692A corresponds to an example of the "third adjustment mechanism" that adjusts the tension of the second belt 67A. The support member 692B corresponds to an example of the "fourth adjustment mechanism" that adjusts the tension of the second belt 67B.

By moving the support member 692 forward with respect to the right side surface member 752 and the left side surface member 753, the second gear 69 moves forward, so that the tension of the second belt 67 can be decreased. Further, by moving the support member 692 rearward with respect to the right side surface member 752 and the left side surface member 753, the second gear 69 moves rearward, so that the tension of the second belt 67 can be increased. In this way, the tension of the second belt 67 can be adjusted by adjusting the position of the second gear 69.

5. Detector for Detecting Origin Position of First Leg Portion

Figure 8:
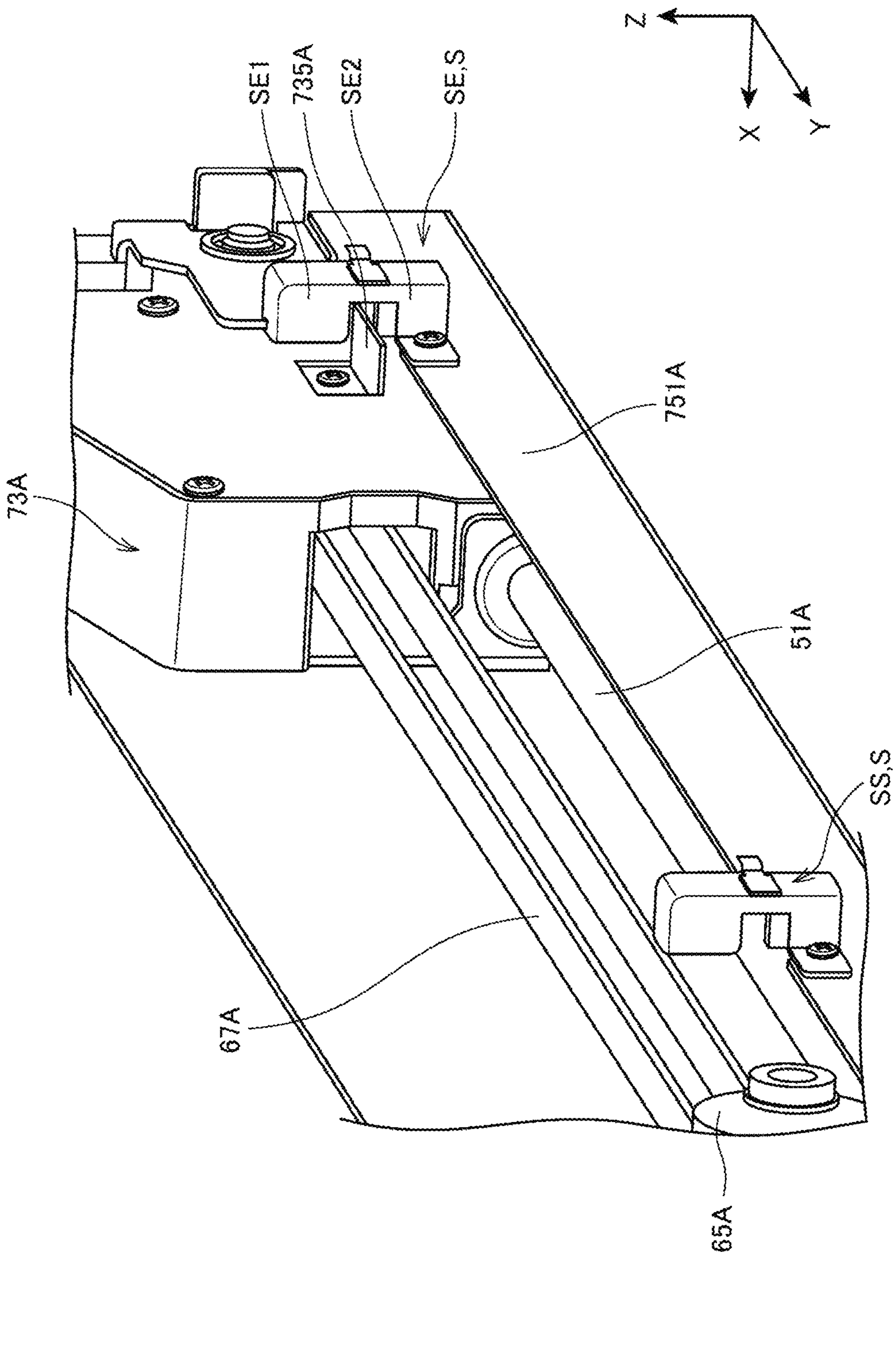
FIG. 8 is a perspective view illustrating an example of a detector for detecting an origin position of the first leg portion in a front-rear direction.

Next, detector S for detecting an origin position of the first leg portion 73A in the front-rear direction will be described with reference to FIG. 8. FIG. 8 is a perspective view illustrating an example of the detector S for detecting the origin position of the first leg portion 73A in the front-rear direction.

Note that in the present embodiment, a case where the detector S detects the origin position of the first leg portion 73A will be described, but the present embodiment is not limited thereto. The detector S may detect the origin position of the second leg portion 73B.

As illustrated in FIG. 8, the detector S includes a first detector SS and a second detector SE. The first detector SS detects an origin position of a front direction end of the first leg portion 73A. The second detector SE detects an origin position of a rear direction end of the first leg portion 73A.

Each of the first detector SS and the second detector SE includes, for example, a transmissive photoelectric sensor. The first detector SS and the second detector SE are fixed to a right side surface of the bottom member 751A of the frame body 75A.

In the present embodiment, a case where each of the first detector SS and the second detector SE includes a transmissive photoelectric sensor will be described, but the present embodiment is not limited thereto. Each of the first detector SS and the second detector SE may include a reflective photoelectric sensor.

The first detector SS and the second detector SE have configurations identical to each other. Therefore, in the following description, the second detector SE will be described, and the description of the first detector SS will be omitted.

A detection rib 735A is disposed at a right side surface of the first leg portion 73A. The detection rib 735A is formed in a flat plate shape, and is disposed parallel to the XY plane. The second detector SE includes a light emitter SE1 and a light receiver SE2. The light emitter SE1 is disposed above the detection rib 735A. The light receiver SE2 is disposed below the detection rib 735A. The detection rib 735A blocks light emitted from the light emitter SE1 toward the light receiver SE2 when the first leg portion 73A is disposed at the origin position at the rear direction end.

When the detection rib 735A blocks the light emitted from the light emitter SE1 toward the light receiver SE2, the light receiver SE2 outputs a detection signal indicating that the first leg portion 73A is disposed at the origin position at the rear direction end to the unillustrated control unit. The control unit adjusts, for example, a count value indicating the position of the first leg portion 73A in the front-rear direction, based on the detection signal from the light receiver SE2.

As described above, the control unit can adjust, for example, the count value indicating the position of the first leg portion 73A in the front-rear direction, based on a detection result of the detector S. Therefore, a deviation of the count value can be appropriately adjusted. Therefore, the count value indicating the position of the first leg portion 73A in the front-rear direction can be adjusted to be an appropriate value.

6. Effects and the Like

As described above, the printing apparatus 1 according to the present embodiment includes the medium support portion 30 that supports the printing medium M, the recording head 89*a* that performs printing on the printing medium M, the moving mechanism 70 that supports the recording head 89*a* and is configured to be movable in the front-rear direction with respect to the medium support portion 30, and the driving mechanism 50 that moves the moving mechanism 70 in the front-rear direction, wherein the moving mechanism 70 includes the first guide shaft 51A that is provided rightward the medium support portion 30 in the left-right direction and extends in the front-rear direction, the second guide shaft 51B that is provided leftward the medium support portion 30 in the left-right direction and extends in the front-rear direction, the first leg portion 73A movably supported by the first guide shaft 51A, and the second leg portion 73B movably supported by the second guide shaft 51B, the driving mechanism 50 includes the leg-driving motor 61, the transmission structure 60 that transmits the driving force generated by the leg-driving motor 61 to the first leg portion 73A and the second leg portion 73B, the leg-driving motor 61 is disposed between the first guide shaft 51A and the second guide shaft 51B in the left-right direction, and drives the first leg portion 73A and the second leg-portion 73B in the front-rear direction.

According to this configuration, the leg-driving motor 61 is disposed between the first guide shaft 51A and the second guide shaft 51B in the left-right direction. Thus, it is possible to suppress occurrence of a difference between the driving force transmitted from the leg-driving motor 61 to the transmission structure 60 that transmits the driving force to the first leg portion 73A, and the driving force transmitted from the leg-driving motor 61 to the transmission structure 60 that transmits the driving force to the second leg portion 73B. Therefore, the first leg portion 73A and the second leg portion 73B can be smoothly moved.

In addition, in the printing apparatus 1, the leg-driving motor 61 is disposed substantially at the center between the first guide shaft 51A and the second guide shaft 51B in the left-right direction.

According to this configuration, the leg-driving motor 61 is disposed substantially at the center between the first guide shaft 51A and the second guide shaft 51B in the left-right direction. Thus, it is possible to suppress occurrence of a difference between the driving force transmitted from the leg-driving motor 61 to the transmission structure 60 that transmits the driving force to the first leg portion 73A, and the driving force transmitted from the leg-driving motor 61 to the transmission structure 60 that transmits the driving force to the second leg portion 73B. Therefore, the first leg portion 73A and the second leg portion 73B can be smoothly moved.

In addition, in the printing apparatus 1, the transmission structure 60 includes the single drive shaft 62 extending in the left-right direction, the first transmission structure 60A that transmits the driving force from the drive shaft 62 to the first leg portion 73A, and the second transmission structure 60B that transmits the driving force from the drive shaft 62 to the second leg portion 73B, and the first transmission structure 60A and the second transmission structure 60B are configured to be identical to each other.

According to this configuration, the first transmission structure 60A and the second transmission structure 60B are configured to be identical to each other. Therefore, it is possible to suppress occurrence of a difference between the driving force transmitted to the first leg portion 73A by the first transmission structure 60A and the driving force transmitted to the second leg portion 73B by the second transmission structure 60B. Therefore, the first leg portion 73A and the second leg portion 73B can be smoothly moved.

In addition, in the printing apparatus 1, the first transmission structure 60A and the second transmission structure 60B each include the first gear 621 disposed at the end portion of the drive shaft 62 in the left-right direction, include the second belts 67 that transmit the driving force to the first leg portion 73A and the second leg portion 73B, each include the first belt 63 that transmits the driving force between the first gear 621 and the second belt 67, and the composite gear 65 that transmits the driving force between the first belt 63 and the second belt 67, the first gear 621A of the first transmission structure 60A and the first gear 621B of the second transmission structure 60B are configured to be identical to each other, and the composite gear 65A of the first transmission structure 60A and the composite gear 65B of the second transmission structure 60B are configured to be identical to each other.

According to this configuration, the first gear 621A of the first transmission structure 60A and the first gear 621B of the second transmission structure 60B are configured to be identical to each other, and the composite gear 65A of the first transmission structure 60A and the composite gear 65B of the second transmission structure 60B are configured to be identical to each other. Therefore, it is possible to suppress occurrence of a difference between the driving force transmitted to the first leg portion 73A via the first gear 621A and the composite gear 65A and the driving force transmitted to the second leg portion 73B via the first gear 621B and the composite gear 65B. Therefore, the first leg portion 73A and the second leg portion 73B can be smoothly moved.

Further, in the printing apparatus 1, the composite gear 65A of the first transmission structure 60A and the composite gear 65B of the second transmission structure 60B are disposed facing in directions identical to each other.

According to this configuration, the composite gear 65A and the composite gear 65B are disposed facing in directions identical to each other. Therefore, it is possible to suppress occurrence of a difference between the driving force transmitted to the first leg portion 73A via the composite gear 65A and the driving force transmitted to the second leg portion 73B via the composite gear 65B. Therefore, the first leg portion 73A and the second leg portion 73B can be smoothly moved.

In addition, in the printing apparatus 1, the first belt 63A of the first transmission structure 60A and the first belt 63B of the second transmission structure 60B are configured by belts of types identical to each other, and the second belt 67A of the first transmission structure 60A and the second belt 67B of the second transmission structure 60B are configured by belts of types identical to each other.

According to this configuration, the first belt 63A and the first belt 63B are configured by the belts of types identical to each other, and the second belt 67A and the second belt 67B are configured by the belts of types identical to each other. Therefore, it is possible to suppress occurrence of a difference between the driving force transmitted to the first leg portion 73A via the first belt 63A and the second belt 67A and the driving force transmitted to the second leg portion 73B via the first belt 63B and the second belt 67B. Therefore, the first leg portion 73A and the second leg portion 73B can be smoothly moved.

In addition, in the printing apparatus 1, the width of the second belt 67 is larger than the width of the first belt 63.

According to this configuration, the width of the second belt 67 is larger than the width of the first belt 63. Therefore, occurrence of a difference between a moving speed of the first leg portion 73A and a moving speed of the second leg portion 73B can be suppressed. Therefore, the first leg portion 73A and the second leg portion 73B can be smoothly moved.

In addition, in the printing apparatus 1, in the first transmission structure 60A, the second belt 67A is disposed leftward in the left-right direction with respect to the first leg portion 73A, and in the second transmission structure 60B, the second belt 67B is disposed leftward in the left-right direction with respect to the second leg portion 73B.

According to this configuration, the second belt 67A is disposed leftward in the left-right direction with respect to the first leg portion 73A, and the second belt 67B is disposed leftward in the left-right direction with respect to the second leg portion 73B. Therefore, occurrence of a difference between a moving speed of the first leg portion 73A and a moving speed of the second leg portion 73B can be suppressed. Therefore, the first leg portion 73A and the second leg portion 73B can be smoothly moved.

In addition, in the printing apparatus 1, the first transmission structure 60A includes the tension-adjusting pulley 64A that adjusts the tension of the first belt 63A, the second transmission structure 60B includes the tension-adjusting pulley 64B that adjusts the tension of the first belt 63B, and the tension-adjusting pulley 64A and the tension-adjusting pulley 64B are disposed at the same position in the vertical direction.

According to this configuration, the tension-adjusting pulley 64A and the tension-adjusting pulley 64B are disposed at the same position in the vertical direction. It is possible to suppress occurrence of a difference between influence of the tension-adjusting pulley 64A on the driving force transmitted by the first belt 63A and influence of the tension-adjusting pulley 64B on the driving force transmitted by the first belt 63B. Therefore, the first leg portion 73A and the second leg portion 73B can be smoothly moved.

In addition, in the printing apparatus 1, the first transmission structure 60A includes the support member 692A that adjusts the tension of the second belt 67A, the second transmission structure 60B includes the support member 692B that adjusts the tension of the second belt 67B, and the support member 692A and the support member 692B are disposed at the same position in the vertical direction.

According to this configuration, the support member 692A and the support member 692B are disposed at the same position in the vertical direction. It is possible to suppress occurrence of a difference between influence of the support member 692A on the driving force transmitted by the second belt 67A and influence of the support member 692A on the driving force transmitted by the second belt 67B. Therefore, the first leg portion 73A and the second leg portion 73B can be smoothly moved.

In addition, in the printing apparatus 1, the first transmission structure 60A includes the detector S that detects the origin position of the first leg portion 73A in the front-rear direction, and the detector S is disposed on a side opposite to the second belt 67A with respect to the first leg portion 73A.

According to this configuration, the detector S detects the origin position of the first leg portion 73A in the front-rear direction. Therefore, it is possible to correct count values of the positions of the first leg portion 73A and the second leg portion 73B in the front-rear direction. In addition, the detector S is disposed on the side opposite to the second belt 67A with respect to the first leg portion 73A. Therefore, the origin position of the first leg portion 73A in the front-rear direction can be accurately detected without being affected by the second belt 67A.

In addition, in the printing apparatus 1, the first leg portion 73A and the second leg portion 73B are configured to be identical to each other.

According to this configuration, the first leg portion 73A and the second leg portion 73B are configured to be identical to each other. Therefore, the first leg portion 73A and the second leg portion 73B can be smoothly moved.

5. Other Embodiments

The above-described present embodiment is merely a specific example to which the present disclosure is applied. The present disclosure is not limited to the configuration of the above-described present embodiment, and can be implemented in various aspects without departing from the gist of the disclosure.

In the present embodiment, the case where the leg-driving motor 61 is disposed between the first guide shaft 51A and the second guide shaft 51B in the left-right direction has been described, but the present embodiment is not limited thereto. For example, the leg-driving motor 61 may be disposed at the substantially central position between the first guide shaft 51A and the second guide shaft 51B in the left-right direction. In addition, for example, the leg-driving motor 61 may further be disposed at the central position between the first belt 63A of the first transmission structure 60A and the first belt 63B of the second transmission structure 60B in the left-right direction.

When the leg-driving motor 61 is disposed at the central position between the first belt 63A of the first transmission structure 60A and the first belt 63B of the second transmission structure 60B in the left-right direction, the driving force transmitted to the first transmission structure 60A and the driving force transmitted to the second transmission structure 60B can be made equal to each other. Therefore, the first leg portion 73A and the second leg portion 73B can be smoothly moved.

In the present embodiment, the case where the second belt 67 is disposed leftward the leg portion 73 has been described, but the present embodiment is not limited thereto. For example, the second belt 67 may be disposed rightward the leg portion 73. In this case, the second belt 67A is disposed rightward the first leg portion 73A, and the second belt 67B is disposed rightward the second leg portion 73B.

In the present embodiment, the configuration has been described in which, after liquid is ejected onto the printing medium M by the recording head 89*a*, irradiation light is emitted from the irradiation unit 89*b* to the landed liquid, but this is an example. For example, the printing apparatus 1 need not include the irradiation unit 89*b*.

What is claimed is:

1. A printing apparatus, comprising:
a medium support portion configured to support a printing medium;
a printing unit configured to perform printing on the printing medium;
a moving mechanism configured to support the printing unit and to be movable in a first direction with respect to the medium support portion; and
a driving mechanism configured to move the moving mechanism in the first direction, wherein
the moving mechanism includes
a first guide shaft provided on one side with respect to the medium support portion in a second direction intersecting the first direction, and extending in the first direction,
a second guide shaft provided on another side with respect to the medium support portion in the second direction, and extending in the first direction,
a first leg portion movably supported by the first guide shaft, and
a second leg portion movably supported by the second guide shaft,
the driving mechanism includes a driving source, and a transmission structure for transmitting driving force generated by the driving source to the first leg portion and the second leg portion, and
the driving source
is disposed between the first guide shaft and the second guide shaft in the second direction, and
drives the first leg portion and the second leg portion in the first direction.

2. The printing apparatus according to claim 1, wherein
the drive source is disposed at a substantially center between the first guide shaft and the second guide shaft in the second direction.

3. The printing apparatus according to claim 1, wherein
the transmission structure includes
a single drive shaft extending in the second direction,
a first transmission structure for transmitting driving force from the drive shaft to the first leg portion, and
a second transmission structure for transmitting the driving force from the drive shaft to the second leg portion, and
the first transmission structure and the second transmission structure are configured to be identical to each other.

4. The printing apparatus according to claim 3, wherein
each of the first transmission structure and the second transmission structure includes
a first gear disposed at an end portion of the drive shaft in the second direction,
a second belt for transmitting the driving force to each of the first leg portion and the second leg portion,
a first belt for transmitting the driving force between the first gear and the second belt, and
a composite gear for transmitting the driving force between the first belt and the second belt,
the first gear of the first transmission structure and the first gear of the second transmission structure are configured to be identical to each other, and
the composite gear of the first transmission structure and the composite gear of the second transmission structure are configured to be identical to each other.

5. The printing apparatus according to claim 4, wherein
the composite gear of the first transmission structure and the composite gear of the second transmission structure are disposed facing in directions identical to each other.

6. The printing apparatus according to claim 4, wherein
the first belt of the first transmission structure and the first belt of the second transmission structure include belts of types identical to each other, and
the second belt of the first transmission structure and the second belt of the second transmission structure include belts of types identical to each other.

7. The printing apparatus according to claim 4, wherein
a width of the second belt is larger than a width of the first belt.

8. The printing apparatus according to claim 4, wherein
in the first transmission structure, the second belt is disposed on the other side in the second direction with respect to the first leg portion, and
in the second transmission structure, the second belt is disposed on the other side in the second direction with respect to the second leg portion.

9. The printing apparatus according to claim 4, wherein
the first transmission structure includes a first adjustment mechanism for adjusting tension of the first belt,
the second transmission structure includes a second adjustment mechanism for adjusting the tension of the first belt, and
the first adjustment mechanism and the second adjustment mechanism are disposed at the same position in the vertical direction.

10. The printing apparatus according to claim 4, wherein
the first transmission structure includes a third adjustment mechanism for adjusting tension of the second belt,
the second transmission structure includes a fourth adjustment mechanism for adjusting the tension of the second belt, and
the third adjustment mechanism and the fourth adjustment mechanism are disposed at the same position in the vertical direction.

11. The printing apparatus according to claim 4, wherein
the first transmission structure includes a detector for detecting an origin position of the first leg portion in the first direction, and
the detector is disposed on a side opposite to the second belt with respect to the first leg portion.

12. The printing apparatus according to claim 1, wherein
the first leg portion and the second leg portion are configured to be identical to each other.

* * * * *